United States Patent [19]

Reynolds

[11] 3,972,250
[45] Aug. 3, 1976

[54] SINGLE POINT THREADING ATTACHMENT WITH LEAD-SCREW ROTATIONAL TIMING MEANS

[76] Inventor: William B. Reynolds, 1128 Gatewood, SW., Albuquerque, N. Mex. 87105

[22] Filed: Sept. 2, 1975

[21] Appl. No.: 609,212

[52] U.S. Cl. ..................................................... 82/5
[51] Int. Cl.² ......................................... B23B 1/00
[58] Field of Search ........................................ 82/5

[56] References Cited
UNITED STATES PATENTS

| | | | |
|---|---|---|---|
| 2,590,224 | 3/1952 | Armstrong | 82/5 X |
| 2,854,822 | 10/1958 | Lee | 82/5 X |
| 2,903,933 | 9/1959 | MacKenzie | 82/5 |
| 3,121,357 | 2/1964 | Skoglund et al. | 82/5 |
| 3,501,984 | 3/1970 | Hofmann | 82/5 |

*Primary Examiner*—Harrison L. Hinson
*Attorney, Agent, or Firm*—Richard A. Bachand

[57] ABSTRACT

A single point threading attachment for use on an engine lathe includes a cutting tool carrying an advancing block adapted to be mounted to the carriage, a half-nut closing mechanism, a lead-screw timing mechanism, a pneumatic carriage control, and a control circuitry for coordinating the operation thereof. The attachment is intended for use in successive cutting passes upon a workpiece carried in a conventional engine lathe upon which the attachment is mounted. The timing control is adapted to be mounted upon or formed from a modified existing engine lathe timing dial, and includes a plurality of pins carried upon a plate mounted on the shaft of the timing dial. A pair of switches are mounted adjacent the timing dial shaft to be engaged by the rotating pins. The switches are located at an angle slightly larger than a multiple of the angle separating adjacent pins upon the plate of the timing dial shaft. Thus, as the timing dial shaft is rotated, the switches are successively actuated to require successive closure of the switches prior to the actuation of the respective carriage and work tool advancements. Circuitry is provided responsive to the successive closure of the switches to pneumatically close the half-nuts to advance the carriage, and to successively advance the cutting tool into the direction of the workpiece. At the end of the cutting pass, a switch is actuated to remove the pneumatic pressure, to thereby open the half-nuts and concurrently withdraw the cutting tool from the workpiece. Thereafter, the pneumatic cylinder is operated to return the carriage to its initial position, whereupon the cycle is repeated upon the proper actuation of the switches of the timing mechanism.

5 Claims, 8 Drawing Figures

SINGLE POINT THREADING ATTACHMENT WITH LEAD-SCREW ROTATIONAL TIMING MEANS

BACKGROUND OF THE INVENTION

1. Field of the Invention

This invention relates to improvements in attachments for use with engine lathes, and, more particularly, to improvements in single point threading apparatuses for use with engine lathes, and still more particularly to improvements in cutting tool and carriage advancement control timing means driven by and synchronized to the rotation of a lead-screw of an engine lathe.

2. Background of the Invention

It has been proposed to provide automatic single point threading apparatuses for use on existing engine lathes. For example, Mackenzie in U.S. Pat. No. 2,903,933 discloses an automatic threading apparatus for use on an existing lathe. The apparatus is mounted, for the most part, on the carriage of the lathe, and is moveable between first and second locations determined by limit switches mounted on the bed of the lathe. A tool carrying block is mounted on the cross slide of the lathe, and includes means for advancing the cutting tool in successively increasing increments with each successive pass. The carriage is driven along the ways of the lathe in ordinary fashion; that is by closing the half-nuts onto the lead-screw. A pneumatic cylinder is attached to the carriage to return it to an initial cutting position.

One of the problems encountered in both manual and automatic operation of engine lathes in single point threading is the timing of the advancement of the cutting tool into the workpiece. Typically, engine lathes are provided with a timing dial which is coupled by a gear directly to the lead-screw, and which includes a hand which is rotated by the rotation of the lead-screw to present a relative reading of the rotation of the lead-screw. Ordinarily, in the manual operation of the lathe, the operator, after adjusting the distance to which the cutting tool will be moved into the workpiece during the cutting operation, manually advances the cutting tool into the turning workpiece. This is done as the needle on the timing dial passes one of the numbers thereon. Depending upon whether even or odd numbered threads are being cut in the workpiece, the operator may advance the cutting tool at any number, or all even or all odd numbers respectively. This manual procedure, however, requires that the engine lathe be operated at relatively slow rotational velocities. Additionally, because of the high degree of operator attention required, this results in operator fatigue after relatively short operating times. On the other hand, with most of the automatic single point threading apparatuses proposed heretofore, no adequate timing mechanism has been employed, except, for example, extremely complicated gearing mechanisms, multi-start clutches, or reversible carriage direction producing means during the cutting process.

SUMMARY OF THE INVENTION

In light of the above, therefore, it is an object of the invention to provide a single point threading attachment mountable on an existing engine lathe.

It is another object of the invention to provide a single point threading attachment having the capability of forming threads of any desired length up to the length capabilities of the lathe.

It is still another object of the invention to provide a single point threading attachment which can employ successive repetitive cutting passes, each of an adjustably selective depth.

It is yet another object of the invention to provide a single point threading attachment for an engine lathe which is automatic in operation.

It is another object of the invention to provide means for use in conjunction with an engine lathe to control the advancement of the cutting tool into the workpiece and of the carriage along the ways in relationship to the rotational position of the lead-screw of the lathe.

It is still another object of the invention to provide means for assuring that the starting position of the cutting tool along the workpiece is properly coordinated with the rotational position of the lead-screw of the lathe.

It is still another object of the invention to provide automatic means for controlling the opening and closing of the half-nuts of the carriage about the lead-screw.

It is yet another object of the invention to provide an automatic single point threading attachment for use on an engine lathe which can utilize a modified existing timing dial of the lathe to provide timing for advancement of the cutting tool and of the carriage.

These and other objects, features and advantages will become apparent to those skilled in the art from the following detailed description, when read in conjunction with the accompanying drawing and appended claims.

The invention, in its broad aspect, presents a single point threading attachment for use on an existing engine lathe, adapted to use, for the most part, on existing engine lathe equipment. The single point threading attachment has four main assemblies, the tool indexing and advancing assembly, which is mounted to the carriage slide assembly; the half-nut closing assembly, which is mounted to the carriage and operates to close the half-nuts thereof; the lead-screw timing assembly, which is mountable upon an existing timing dial for producing an indication of the rotational position of the lead-screw; and a pneumatic carriage return, mounted to the bed of the lathe and connected to the carriage to return it to an initial starting position for successive cutting passes upon a workpiece carried by the lathe. An electrical and pneumatic control circuit is included to coordinate the functions of the timing apparatus, tool advance and carriage and control apparatus.

The single point threading attachment is adapted to repetitively pass a cutting tool past a workpiece carried by the lathe, each time advancing the cutting tool a predetermined distance into the workpiece. At the end of the predetermined number of cutting passes, the apparatus automatically stops.

The advancement of the carriage along the ways of the lathe and the advancement of the cutting tool into the workpiece are synchronized with the rotational position of the lead-screw by a timing mechanism, which can be a modified form of the existing timing dial on most commercially available engine lathes. The timing mechanism includes a shaft which is coupled to the lead-screw by gears or the like to rotate at a controllable velocity with respect to the rotation of the lead-screw. A plate is attached to the shaft, and a plurality of equally spaced outstanding protrusions or pins are carried upon the plate. A pair of means, such as switches, which engage the protrusions are mounted adjacent the shaft to be closeable by the pins as they are rotated. The control circuitry, upon the successive closing of the switches closes the half-nuts to advance the carriage, and concurrently advances the cutting tool in the direction of the workpiece. The timing arrangement insures that the half-nuts are always closed at a predetermined angular location of the lead-screw to precisely place the cutting tool along the length of the workpiece.

BRIEF DESCRIPTION OF THE DRAWING

The invention is illustrated in the accompanying drawing, wherein.

In the various figures of the drawing, like reference numerals are used to denote like parts.

DETAILED DESCRIPTION OF THE PREFERRED EMBODIMENTS

Figure 1:
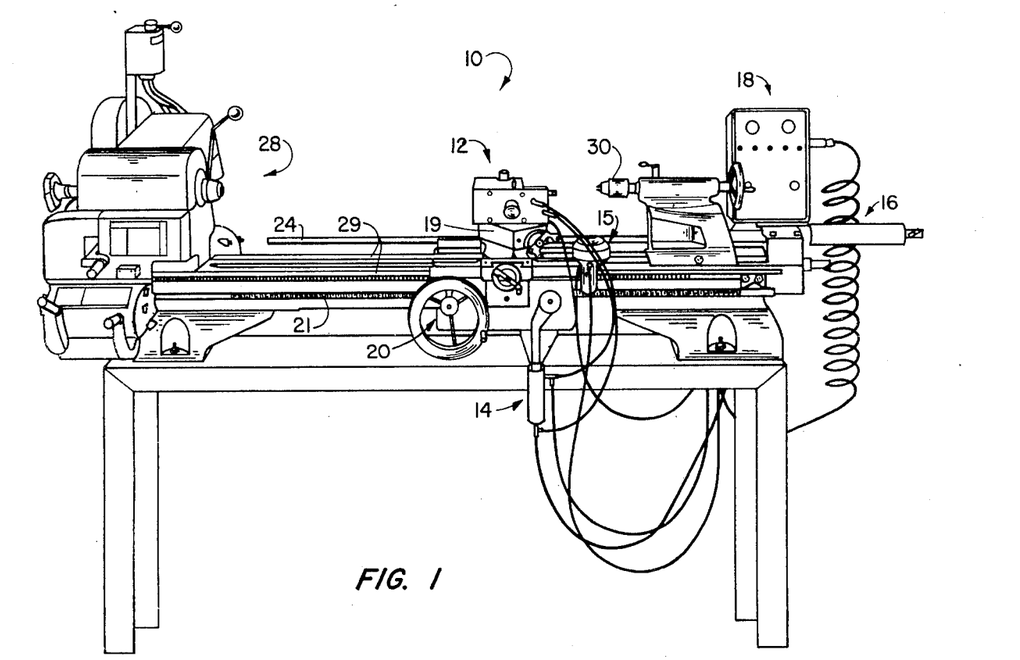
FIG. 1 is a perspective view of a typical engine lathe incorporating thereon the single point threading attachment, in accordance with the invention.

The single point threading apparatus in accordance with the invention is adapted to be mounted on an existing engine lathe 10, as shown in FIG. 1. Engine lathes are well known in the art, and their details are not described further herein. The single point threading apparatus of the invention mounted on the lathe 10 includes five main assemblies: a cutting tool indexing and advancing assembly 12, a half-nut control assembly 14, a lead-screw timing assembly 15, a pneumatic carriage control assembly 16, and an over-all control box assembly 18. As shown, the cutting tool indexing and advancing assembly 12 is mounted on the cross-slide 19 carried on the carriage 20. The carriage 20 is driven by the lead-screw 21, in the usual fashion, except for its initial and terminal connections by the half-nut control assembly 14, as below described.

The carriage 20 is adjustably attachable to an elongated rod 24 which is controllable in its longitudinal position by the pneumatic carriage control assembly 16.

In over-all operation, a workpiece of stock material (not shown) upon which threads are to be formed is inserted into the lathe, for example, to be held by the head stock 28 and extending in the direction of the tail stock 30. The carriage 20 is positioned adjacent the location of the workpiece, and the apparatus is started by the appropriate button of the control box assembly 18, as below described. The cutting tool carried by the tool indexing and advancing apparatus 12 is advanced into the work-piece. Simultaneously, the half-nuts controlled by the half-nut closing apparatus 14 are closed in timed relationship with the rotational position of the lead-screw 21 to begin movement of the carriage along the ways 29 at a speed determined by the rotational velocity of the lead-screw 21. Upon completion of the cutting pass along the desired length of the workpiece, the cutting tool is withdrawn, and the half-nuts opened so that the carriage 20 is advanced no further. The pneumatic carriage control assembly 16 is then energized to move the carriage 20 to its initial position. At the same time, the tool is indexed to enable it to cut deeper into the workpiece on the next subsequent pass. The process is repeated until the thread is cut in the workpiece to the desired depth, at which time the operation is automatically stopped.

Figure 2:
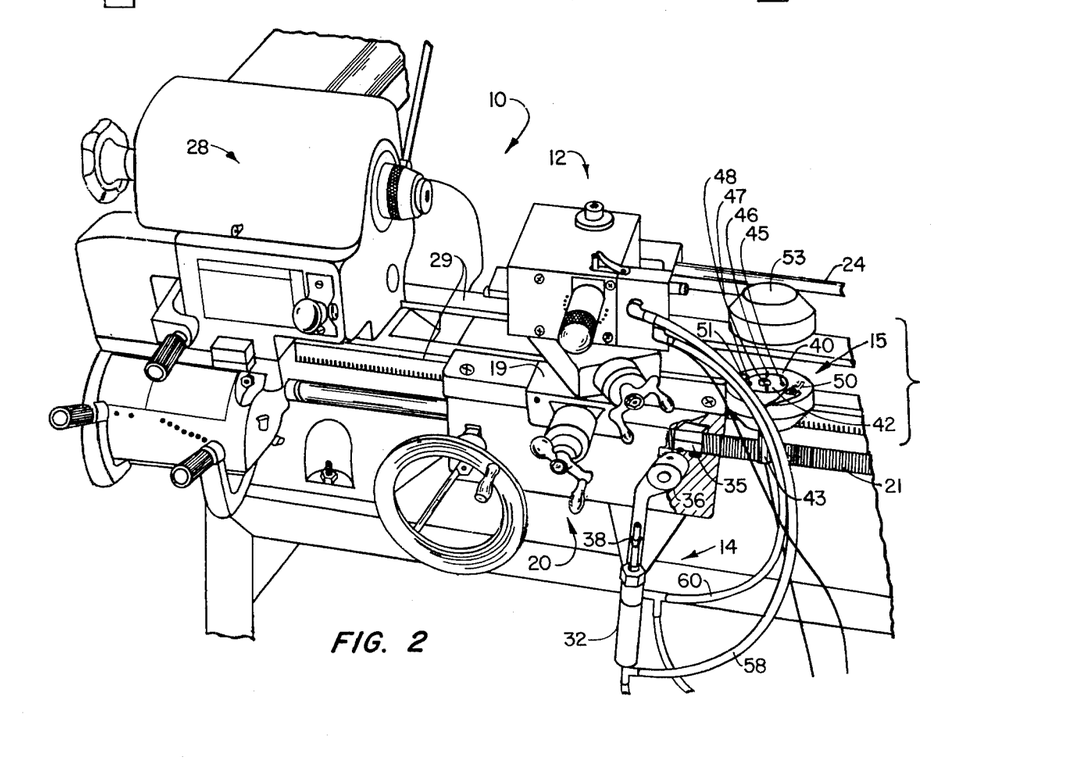
FIG. 2 is a perspective view of the cutting tool indexing and advancing assembly, the half-nut closing assembly, and the lead-screw timing assemblies of the single point threading attachment of the invention showing the lead-screw timing assembly in exploded view.

More particularly, with reference to FIG. 2, the half-nut control assembly 14 is shown, including a half-nut controlling pneumatic cylinder 32 and the lead-screw timing assembly 15. The half-nuts within the carriage are unmodified, connection being made thereto externally, as shown. As shown in the cutaway portion of the carriage 20, the engagement of the half-nuts 35 is controlled by a cam 36, which is moved upwardly and downwardly by the plunger or piston portion 38 of the pneumatic tube 32. Thus, when pneumatic pressure is applied to the pneumatic cylinder 32 via line 58, the piston 38 is moved upwardly to cause the half-nuts 35 to disengage the lead-screw 21. When the pneumatic pressure is released from the bottom side of the pneumatic tube 32, on the other hand, and applied to the top portion thereof via line 60, the piston 38 is withdrawn from the entended position, thereby moving the half-nuts 35 into engagement with the lead-screw 21. Thus, when the half-nuts engage the lead-screw 21, the carriage 20 is driven thereby along the ways 29 of the lathe 10, and when the half-nuts are free from engagement of the lead-screw the carriage 20 is freely movable along ways 29 of the lathe 10 to its initial position.

The timing of the initiation of movement of the carriage 20 along the ways 29 of the lathe 10 is critical in the formation of cutting of threads into the workpiece. If the cutting tool is advanced, for example, at a different rotational angle of the workpiece on each subsequent pass, the threads cut by the previous pass would be defaced or obliterated. It is essential, therefore, that the cutting tool be advanced and the driving movement of the carriage 20 be initiated at precisely the same longitudinal and rotational locations along the stock material on each cutting pass. This synchronization is achieved by the timing assembly 15 mounted to the carriage 20. The timing assembly 15 in the embodiment illustrated is formed from a modified timing dial typically furnished with most commercial engine lathes. The timing assembly 15 includes a frame 40 which is attached by a bracket (not shown) to the carriage 20. A rotatable center shaft 42 is driven by a gear 43 in engagement with the lead-screw 21. A plate 44 (see FIG. 7) is mounted to the shaft 42, and four outstanding protrusions or pins 45–48 are carried on the plate 44 of the rotating shaft 42. Two microswitches 50 and 51 are mounted on the frame 40 in a manner below described in detail with respect to FIG. 7 to engage the pins 45–48 as they are moved thereby. The rotation of the shaft 42 and the particular timing engagement of the pins 45–48 with the microswitches 50 and 51 precisely determine the rotational position of the lead-screw 21 as below described. A cover 53 is provided for the timing assembly 15 so that it will be unaffected by metal chips or other parts which may be produced during the cutting operation of the threading apparatus.

The advancement and retraction of the cutting tool carried by the cutting tool assembly 12 is synchronized additionally with the opening and closure of the half-nuts 35 by common connection of the pneumatic pressure which controls the pneumatic cylinder 32. Thus, the pneumatic connection to the top of the pneumatic cylinder 32 is conducted by a tube 60 to the cutting tool advancing assembly 12 to advance the cutting tool in synchronism with the closing of the half-nuts 35. The bottom pneumatic connection to the pneumatic tube 32 is conducted by a tube 58 to the tool carrying assembly 12 to advance the cutting tool in synchronism with the closure of the half-nuts 35. The details of the advancement and retraction of the cutting tool by the cutting tool indexing and advancing assembly 12 is described in detail with reverence to FIG. 5 below.

Figure 3:
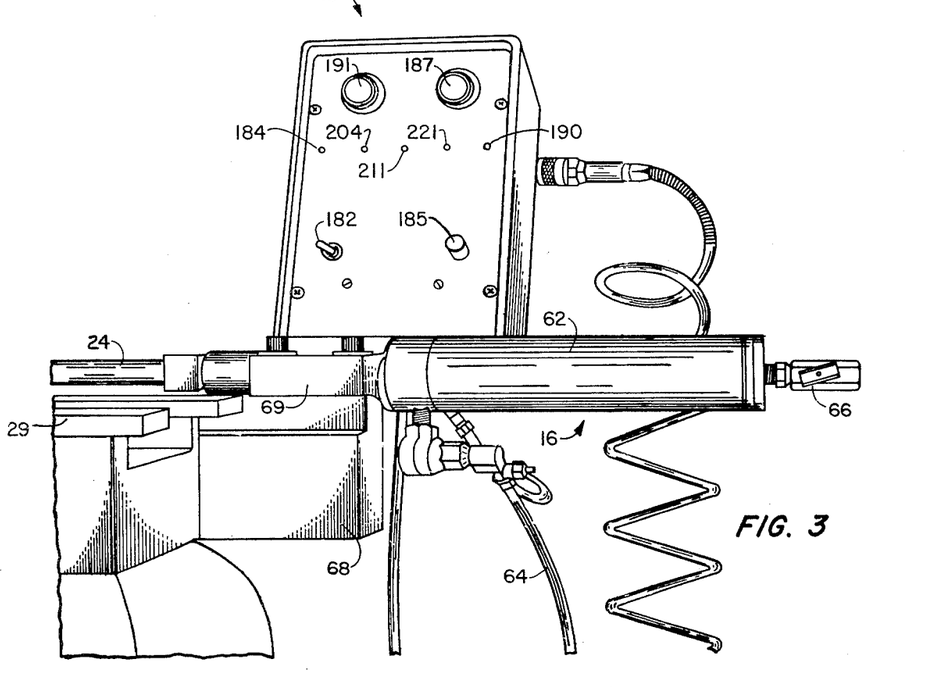
FIG. 3 is a plan view of the pneumatic carriage control or return assembly and the control circuitry cabinet used in conjunction with the single point threading attachment of the invention.

As mentioned above, the carriage 20 of the lathe 10 is connected to a control rod 24, the longitudinal position of which is controlled by the pneumatic carriage control assemblies 16 as shown in FIG. 3. The connection of the control rod 24 to the carriage assembly 20 is not shown in the drawing, but can be easily achieved by a bracket attached to the body of the carriage assembly 20. Additionally, if desired, the bracket may include set screws to selectively engage the positioning rod 24 to a precise location along the length of the lathe 10. As shown in FIG. 3, the position control rod 24 is connected to the plunger within the pneumatic cylinder 62 of the pneumatic carriage control assembly 16. At the end of the travel of the carriage 20, after a cutting pass along the workpiece, pneumatic pressure is applied via a tube 64 to the pneumatic cylinder 62. The plunger within the pneumatic cylinder 62 is therefore withdrawn into the cylinder, thereby returning the carriage 20 to its initial starting position (the half-nuts 35 having been previously moved to the disengage position at the end of the cutting stroke, as above described). A valve 66 is attached to the end of the pneumatic cylinder 62 to relieve the pressure therein at a controllable rate to enable the plunger and the position control rod 24 carried therewithin to be moved as rapidly as desired to the initial starting position. The cylinder 62 is mounted directly to the base 68 of the lathe 10 by a block or frame 69.

Figure 4:
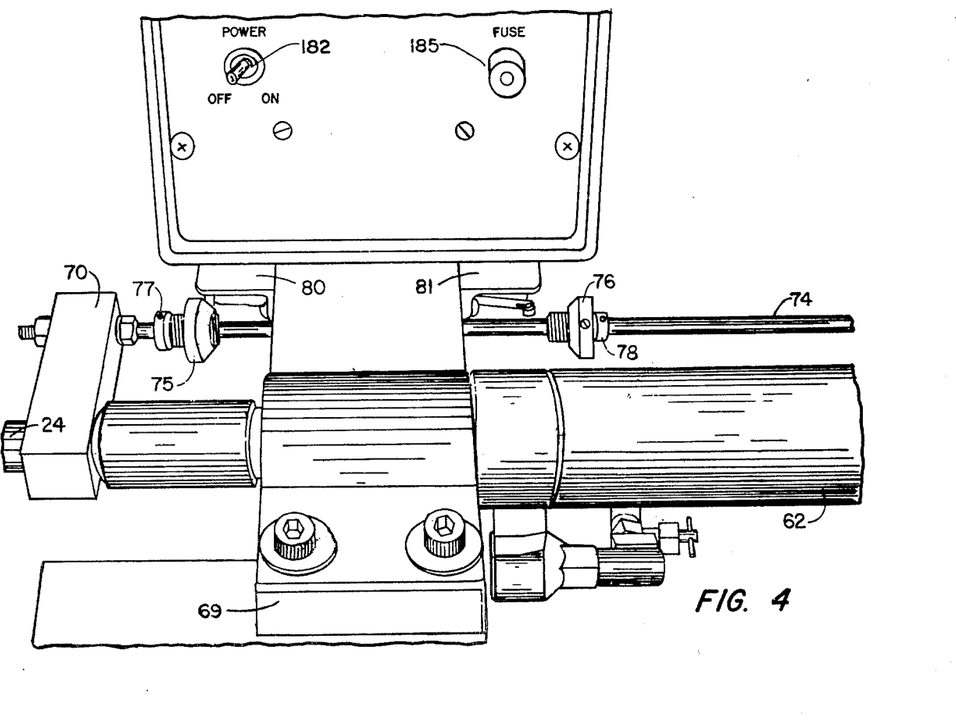
FIG. 4 is a plan view of the carriage position limit control assembly used in conjunction with the single point threading attachment of the invention.

The beginning and end position limits of the carriage 20 are detected by two microswitches carried on the block 69, as shown in FIG. 4. A bracket 70 is attached to the position control rod 24. A rod 74 is carried by the bracket 70, and a pair of shouldered stop nuts 75 and 76 are carried on the rod 74 at the locations corresponding to the start and stop limits, respectively, of the threads desired to be cut. The shouldered stop nuts 75 and 76 are adjustably secured to the control rod 74 by set screws 77 and 78, respectively.

Each of the shouldered stop nuts 75 and 76 engages a respective microswitch 80 and 81 to control the application of the pneumatic pressure to control the carriage and tool advance assemblies as herein described. The cutting tool indexing and advancing assembly 12 is shown in the exploded view in FIG. 5. The cutting tool assembly 12 includes blocks 85–90. The cutting tool (not shown) is mounted to a cylinderically shaped base in a well known fashion. The base 92 includes a groove 93 formed in a portion of its wall. An adjustable set screw 94 is provided to engage an indexing disc 96, below described. The longitudinal movement of the base 92 is controlled by a piston 98 located within a cylinder 99 in the block 87. A piston rod 102 is connected between the piston 98 and the base 92. The piston 98 is movable by pneumatic pressure applied selectively to either side thereof through respective ports 104 and 105.

Figure 5:
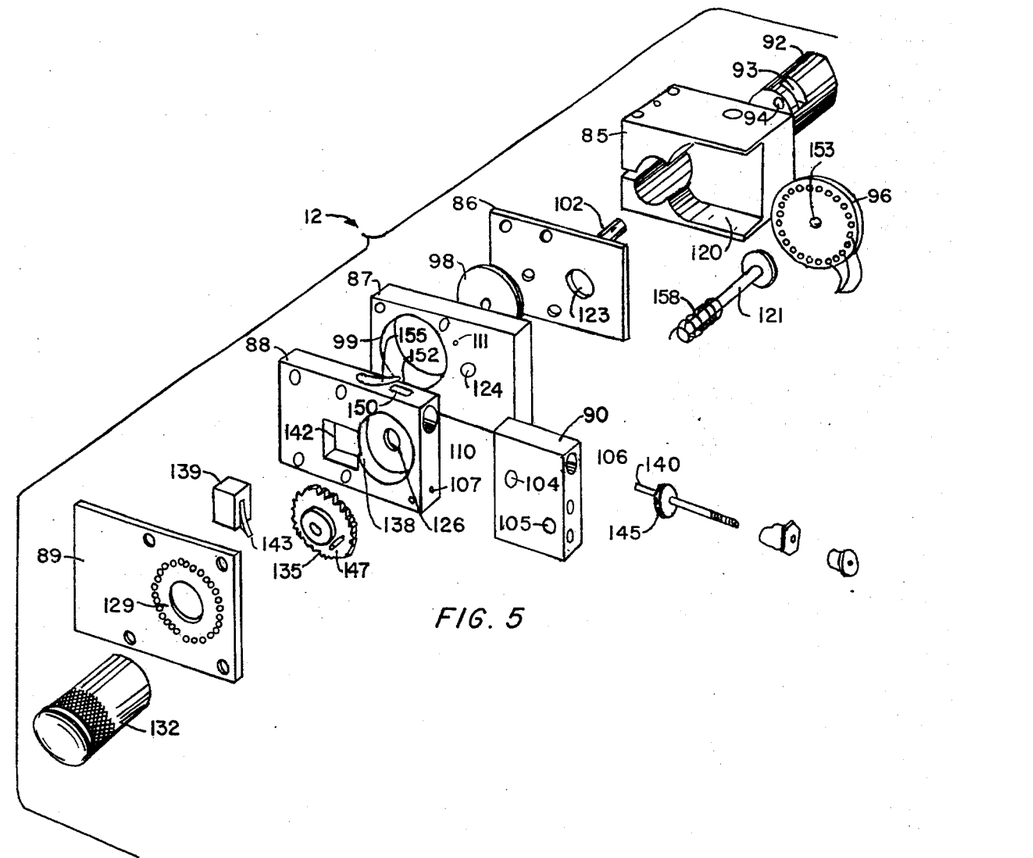
FIG. 5 is an exploded view of the cutting tool indexing and advancing assembly used in conjunction with the single point threading attachment of the invention.

The port or hole 105 receives pneumatic pressure from a line 60, below described, to be directed through a channel (not shown) formed within the block 90 to the outward side of the index controlling piston chamber 106. The pneumatic pressure is additionally conducted by channel (not shown) formed in the block 90 to a channel 107 in the block 88, to be exhausted on the forward side of the piston 98 within the cylinder 99.

The hole 104, on the other hand, communicates via a channel (not shown) in the block 90 with the side of the index controlling piston chamber 106 in the direction of the block 88 to provide pneumatic pressure thereat. Additionally, the hole 104 communicates by a channel (not shown) within the block 90 to the hole 110 in the block 88, which, in turn, communicates with the hole 111 in the block 87, to exit at the back side of the piston 98 within the cylinder 99.

The tool indexing disc 96 is located within a slot or channel 120 within the block 85 in a manner whereby the set screw 94 engages the front face thereof within the groove 93. A shaft 121 extends through a hole 123 in the block 86, 124 in the block 87, 126 in the block 88, and 129 in the block 89 to the front of the cutting tool assembly 12. A handle 132 is mounted on the end of the shaft 121 to enable manual control or rotation of the indexing disc 96. A rachet wheel 135 is mounted on the shaft 121 within a corresponding groove or recess 138 in the block 88. A pawl 140 is slideably carried within the block 90 adjacent and extending into the block 88 to engage the rachet wheel 135. The pawl 140 is mounted to a piston 145 to facilitate pneumatic control of the pawl 140 in synchronism with pneumatic pressure applied to the tool carrying base 92. This pneumatic control can, for example, be achieved by directing pneumatic pressure from within the channel 105 to the rearward side of the piston 145, in the fashion above described, thereby moving the pawl into the direction of the rachet wheel 135 to advance the disc 96 one step. Between cutting passes during the carriage return cycle, pneumatic pressure is applied via the port 104 to move the piston 145 and the pawl 140 out of engagement with the rachet wheel in preparation for the subsequent re-engagement and movement of the rachet wheel 135.

A manual pawl release rod 150 is maintained in engagement with the paul 140 within a slot 152 in the block 88 by a leaf spring 155. Thus, to manually rotate the indexing disc 96, the manual pawl release rod 150 is moved to one side, thereby releasing the pressure on the pawl in the direction of the rachet wheel 135, allowing the handle 132 to be rotated.

The indexing disc 96 includes a plurality of set screw elements 157 threadedly engaged into respective holes adjacent the circumference of the disc 96. Each of the set screws 157 is adjustable to extend a selective distance towards the front of the tool carrying assembly 12. Thus, for example, in the embodiments shown twenty-three such set screws are provided, thereby enabling twenty-three individual tool cutting depths for successive cutting passes to be made. Typically, the first cutting pass would be to a first depth, such as 0.025 inch, the second to a different depth, such as 0.010 inch further than the first pass, and so on. Commonly, the last pass does not advance the cutting tool further, being for the purpose of cutting burrs or other malformed areas from the threaded workpiece. Consequently, the last two set screws 157 of the cycle can be set to the same distance.

Figure 6:
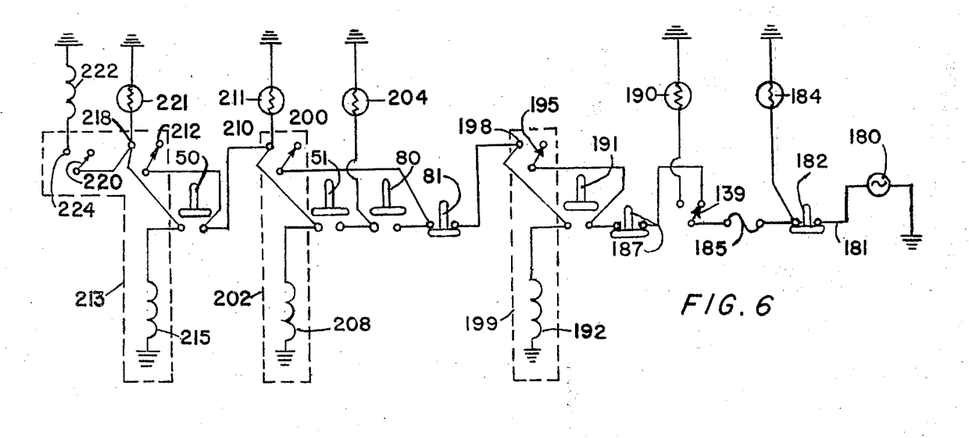
FIG. 6 is an electrical schematic diagram of the electrical control circuit used in conjunction with the single point threading attachment of the invention.

The control circuitry for controlling the operation of the single point threading attachment of the invention is contained in control circuitry box 18, as shown in FIG. 1. An electrical schematic diagram of the control circuitry contained in the box 18 is shown in FIG. 6. As shown, power is applied from a source 180 to the remainder of the circuitry. If desired, a "power on" light, such as the light 184 can be connected from the side of the switch 182 opposite its connection to the power source 180 to ground.

The power on line 181 is conducted via a fuse 185 to a cycle stop switch 139 which is normally closed to establish the circuit to a manual stop switch 187. The manual stop switch 187 is operatable from the face of the control box 18, as shown in FIG. 3. The cycle stop switch 139, as above described with reference to FIG. 5 opens the circuit upon its opening operation. Thus, upon completion of the cycle, the cycle stop switch 139 is moved to an "open" position to energize a reset light 190, connected to ground.

A normally open manual start switch 191 is connected to apply power from the power source 180 to the coil 192 of a relay 194. When the relay 194 operates, its contact 195 is moved to a latching-on position 198, to continue the application of power to the coil 192, until it is opened by the manual stop switch 187 or the cycle stop switch 139. The position 198 of the relay 194 is connected to one side of the limit switch 81 (see FIG. 4). The other side of the end limit switch 81 is connected to the starting limit position switch 80 (see FIG. 4) as well as to the contact 200 of a second relay 202. The contact 202 of the relay 202 is normally open, as shown. The other side of the starting position switch 80 is connected to one side of a sequence light 204, the other side of which is connected to ground. The other side of the starting position switch 80 is also connected to one side of the microswitch 51 of the lead-screw timing assembly 15 (see FIGS. 2 and 7). The other side of the switch 51 is connected to one end of the coil 208 of the relay 202. The other end of the coil 208 is connected to ground. The other side of the switch 51 is also connected to the contact 210 of the relay 202. A sequence light 211 is connected between the contact 210 of the relay 202 and ground. The contact 210 of the relay 202 is connected to one side of the microswitch 50 on the lead-screw timing apparatus (see FIGS. 2 and 7), as well as a normally open contact 212 of a relay 213. The other side of the switch 50 is connected to one end of a coil 215 of the relay 213, the other end of which is connected to ground.

The other side of the switch 50 is also connected to a contact 218 of the relay 213, as well as to a normally open second contact 220. A sequence light 221 is connected between the contact 218 and ground. A solenoid coil 222 is connected between a contact 224 of the relay 213 and ground. The solenoid 222 operates the pneumatic pressure to be applied to the various pneumatically controlled elements, as below described.

Thus, the control circuitry functions as a rather complicated logic circuit, requiring particular open-closed relationships of various switches to precisely control the timing of each of the particular functions required. Thus, for example, at the beginning of a cutting sequence, the power on switch 182 would be in its closed position, as shown. The cycle stop switch 186 would be in its normally closed position, as would stop switch 187. Upon temporarily closing the start switch 191, the latch in relay 194 is activated. The contact 195 applies the power to the contact 198. The end of stroke switch 81 is in a normally closed position, and the starting position switch 80, which is normally open, is closed due to the presence of the carriage at its beginning position. At this point, without the propr sequenced closing of the switches 50 and 51 of the half-nut closing control assembly, the cutting tool will not be advanced. For this even to happen, the switches 50 and 51 must be closed in the proper sequence; that is, switch 51 must first close, to thereby latch relay 202 to its on position to provide power to switch 50 and switch 50 must then be closed to continue the application of the power to the pneumatic controlling solenoid 222. If the switches 50 and 51 are closed in reverse order, the relay 213 would not be activated, since no power is applied to the switch 50.

Figure 7:
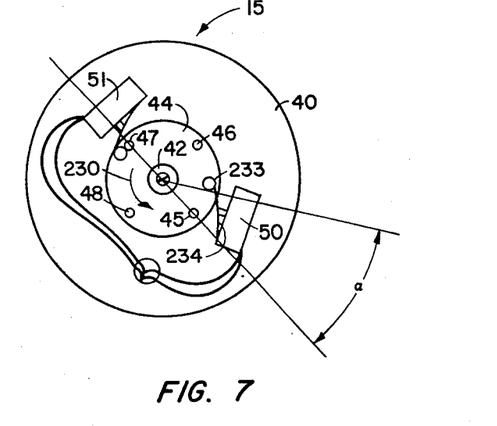
FIG. 7 is a plan view of the timing control assembly used in conjunction with the single point threading attachment of the invention.

The mechanics of this can be appreciated from FIG. 7, a plan view of the lead screw timing apparatus 33. The timing apparatus shown is shown as being modified from a typical timing dial assembly of the type mounted on the carriage with a geared engagement with the lead-screw. The timing dial has been removed, and a plate or disc 44 has been mounted to the shaft 42. The pins 45–48 have then been mounted to be outstanding from the disc 44. The microswitches 50 and 51 are mounted to the outside timing dial case 40. Thus, as the center shaft 42 rotates in the direction of the arrow 230, the pins 45–48 are sequentially moved past the microswitches 50 and 51. At the time one of the pins 47, for example, contacts the microswitch 51, the opposite pin 45 is not yet in contact with the other microswitch 50, being displaced therefrom by an advancement angle $\alpha$. The switches can be, in certain instances, located at a separation angle of just larger than 90°, or just larger than 270°, or just larger than any multiple of the separation angle of the pins 45–48. The just larger than 180° angle shown, however, is preferred. Thus, when the pin 47 contacts the switch 51, the sequence circuitry shown in FIG. 6 is "armed" to be actuated when the opposite pin 45 contacts the other microswitch 50. The reason that two switches are required is to prevent the occurance of improper half-nut closure upon return of the carriage 20 to a beginning position. This mismatch may occur, for example, if one of the pins 45–48 were in contact with a single switch (assuming for purposes of explanation that microswitch 50 has been deleted). Thus, if, for example, pin 47 were in contact with the microswitch 51 at the instant of the carriage return, say, at the leading edge of the contact, the half-nut would close at a different time than if the pin were to be in contact with the switch arm at its trailing edge. Therefore, some means must be provided to assure that the precise time of closure of the half-nuts 35 be first at the desired rotational angle of the lead-screw 21, and, at precisely the same displacement angle along the contact area of the pin and its respective microswitch. By the inclusion of two microswitches, as shown, when the first pin comes into contact with the first microswitch 51, at the instant of carriage return, or at any time thereafter the half-nuts will not be closed and the carriage will not begin its advancement until the second pin comes into contact with the leading edge 233 of the contact member 234 of the microswitch 50.

Furthermore, it should be emphasized that although four pins 45–48 are shown in the embodiment illustrated, any number of pins can be equally advantageously employed. For example, one pin, such as the pin 47 can be used, since once it contacts switch 51, it will activate the half-nug closure apparatus upon coming into contact with the leading edge 233 of the contact 234 of the switch 50. On the other hand, if the pin 47, upon return of the carriage 20 to its initial position, contacts the switch member 234 first, because of the logic circuitry illustrated in FIG. 6, no carriage action will take place until the pin has completed a full revolution closing the switch 51, and recontacting the leading edge 233 of the switch 50. The precise placement of the pins 45–48 is important in that if odd numbered threads are desired to be cut, only two of the pins illustrated are used, those being either pair 45 and 47 or 46 and 48. This is in accordance with the well known practice in the art of beginning the thread cutting operation upon either all even or all odd numbered locations indicated upon the existing timing dials. For even numbered threads, however, four pins can be employed, as shown.

Figure 8:
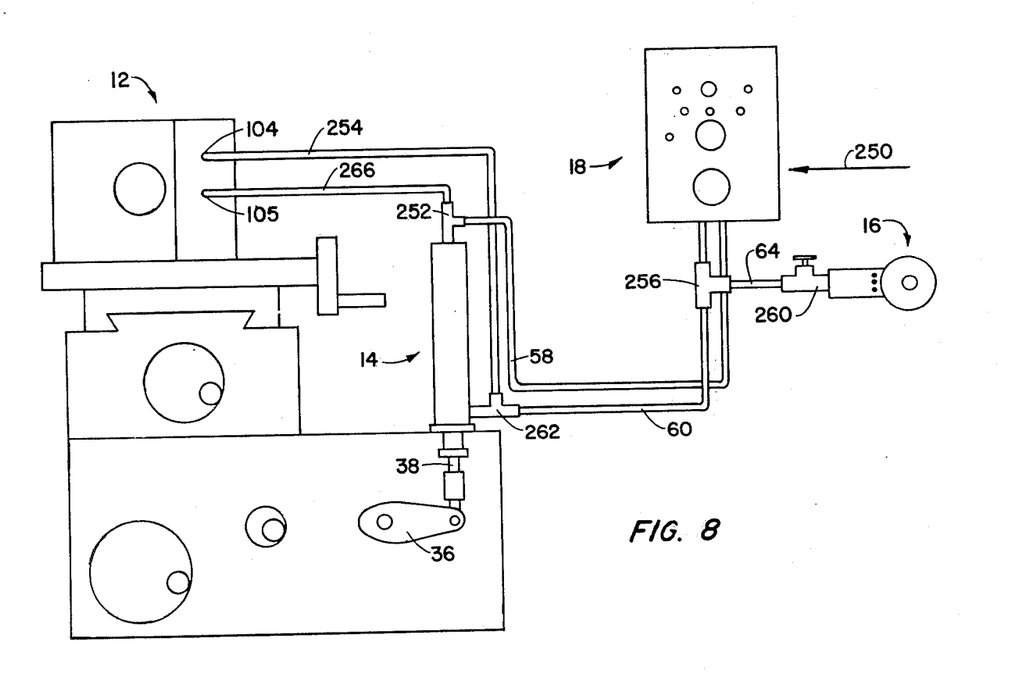
FIG. 8 is a diagram of the pneumatic control lines for operating the half-nut closing assembly, the carriage return assembly, and the tool indexing and advancing assembly.

The pneumatic circuitry for effecting the operation of the apparatus is shown diagramatically in FIG. 8. The pneumatic circuitry employs essentially two pneumatic circuits, one or the other of which is pressurized, as determined by the circuitry solenoid 222 (see FIG. 6) contained in the control housing assembly 18. (In the pneumatic circuit, the half-nut controlling pneumatic cylinder 14 is mounted on the top of the half-nut control, rather than on the bottom as shown in FIGS. 1 and 2). Thus, the "energize" line 58 is pressurized in synchronism with timing switches above described with reference to FIG. 7. The line 58 receives air pressure from an air source 250, which is directed by the solenoid (not shown) within the control housing assembly 18 to the line 58. The line 58 is connected to a tee 252 to direct the pressure therein to the half-nut closing cylinder 14, to extend the piston or plunger rod 38 to close the half-nuts, as above described. Th other side of the tee 252 is directed vial a line 266 to the air inlet port 105, to advance the tool in the manner above described. Upon the completion of the cutting travel of the carriage 20 and the opening of the end of stroke switch 81 (see FIGS. 6 and 4), the solenoid coil 222 is deactivated, thereby applying pneumatic pressure to the line 60.

A tee 256 is located in the pneumatic line 60 to direct the pneumatic pressure upon a line 64 to the carriage return cylinder 16. A needle valve or the like 260 is located in the line 64 to control the pneumatic pressure applied to the carriage control assembly 16. Further downstream upon the line 60, a second tee 262 is used, connected to the base of the pneumatic half-nut closing cylinder 14 to apply pneumatic pressure to move the piston assembly upward into the cylinder to open the half-nuts and stop the travel of the carriage, as above described. The other branch of the line 254 formed by the tee 262 is directed to the other pneumatic control inlet hole 104 in the tool feed block assembly 12, to withdraw the tool from the cutting position, as above described.

Although the invention has been described with a certain degree of particularity, it is understood that the present disclosure is made only by way of example, and that numerous changes in the details of construction and the combination and arrangement of parts may be resorted to without departing from the spirit and scope of the invention as hereinafter claimed.

I claim:

1. In a single point threading apparatus for cutting threads in a workpiece carried upon an engine lathe having a head stock for rotatibly carrying the workpiece, a lead-screw rotated in conjunction with the rotation of said workpiece by said head stock, a carriage including half-nut means for controllably engaging said lead-screw to advance said carriage along side said workpiece, ways upon which said carriage slides, a cutting tool carrying assembly for advancing the cutting tool into the workpiece increasingly with each pass of the carriage therealong, means for returning said carriage to an initial location upon said ways in preparation of a subsequent cutting pass, and means for controlling the number of cutting passes made by the carriage, wherein the improvement comprises, pneumatic half-nut closing means carried by said carriage to move said half-nut means to between open and closed positions: timing means carried by said carriage, including, a central shaft, means for coupling the rotation of said lead-screw to said shaft, whereby said shaft is rotated by said lead-screw, a plate carried upon said shaft, a plurality of pins upstanding from said plate, and a pair of switches carried adjacent said rotating plate to be operated by the passing of said pins adjacent thereto, said switches being located opposite each other by an angle larger than 180°; and a circuit for activating said tool carrying assembly and said pneumatic half-nut closing means for advancing said carriage upon the closure of the switches in a sequence in the direction of rotation, whereby the advance of the carriage along said ways and of the cutting tool into the workpiece is synchronized with the rotation of said lead-screw.

2. The single point threading apparatus improvement of claim 1 wherein said pins are four in number, each located an equal distance from the other.

3. Apparatus for use on an engine lathe for controlling a carriage advancing half-nut pair and a tool advancing means in synchronism with a rotational position of a lead-screw, comprising,
   a timing shaft carried by said carriage rotatibly driven by said lead-screw,
   a plurality of equally spaced outstanding protrusions carried by said shaft,
   a pair of means adjacent said shaft for engaging said protrusions as each is rotatibly moved thereby to produce a signal,
   said signal producing means being spaced apart a distance larger than a multiple of the space between said protrusions, whereby as said shaft rotates, the signal producing means sequentially engages respective ones of said protrusions, and means responsive to the sequentially received signals from said signal producing means for advancing said tool and closing said half-nut pair.

4. Apparatus for use on an engine lathe as claimed in claim 2 wherein:

said timing shaft includes a plate mounted thereto, and a plurality of outstanding pins attached to said plate, and wherein:

said pair of signal producing means are each electrical switches.

5. A single point threading attachment for use with an engine lathe, comprising:

an assembly carried upon a carriage of the lathe for carrying and indexing a cutting tool, responsive to pneumatic pressure selectively applied thereto to advance and retract the cutting tool;

a first pneumatic cylinder attached to a bed of the lathe and adjustably connectable to the carriage of the lathe, operable to move the carriage to an initial position from a finishing position;

a second pneumatic cylinder mounted to the carriage and connected to a means for controlling a half-nut assembly of the lathe to control the movement of the carriage along its bed; and including, a shaft coupled to the lead screw, a disc mounted on said shaft to rotate in conjunction therewith, a plurality of protrusions outstanding from said disc, a pair of switches mounted on said timing assembly adjacent said disc to be engaged by said protrusions, said switches being separated by an angle larger than a multiple of the angle separating said protrusions upon said disc;

means for determining the finishing position of the carriage;

pneumatic pressure applying means connected to said tool indexing and advancing apparatus, and said first and second pneumatic cylinders;

control circuitry connected to said pneumatic pressure applying means and said finishing position determining means, said control circuitry being responsive to the successive closure of the microswitches in the direction of rotation of said disc to apply pneumatic pressure to said second pneumatic cylinder and to said tool indexing and advancing apparatus, whereby the application of the pneumatic pressure is applied in conjunction with one of the said protrusions of said timing apparatus coming into contact with the leading edge of a second actuated switch to advance the cutting tool and initiate the carriage movement;

said control circuitry being responsive to said finishing position determining means to apply pneumatic pressure to said tool indexing and advancing means to withdraw the tool indexing and advancing means to withdraw the tool, and to said first pneumatic carriage control cylinder to return said carriage to its initial position.

* * * * *